United States Patent
Usher et al.

(10) Patent No.: US 11,689,548 B2
(45) Date of Patent: Jun. 27, 2023

(54) DOMAIN CLUSTERING FOR MALICIOUS CAMPAIGN IDENTIFICATION

(71) Applicant: International Business Machines Corporation, Armonk, NY (US)

(72) Inventors: Mark Usher, Gottingen (DE); Johannes Noll, Kassel (DE); Uwe Küllmar, Kassel (DE); Dirk Harz, Kassel (DE); Marc Noske, Lohfelden (DE)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 16/508,466

(22) Filed: Jul. 11, 2019

(65) Prior Publication Data

US 2021/0014252 A1 Jan. 14, 2021

(51) Int. Cl.
*H04L 9/40* (2022.01)
*H04L 61/4511* (2022.01)

(52) U.S. Cl.
CPC ...... *H04L 63/1425* (2013.01); *H04L 61/4511* (2022.05); *H04L 63/1416* (2013.01); *H04L 63/1441* (2013.01); *H04L 2463/061* (2013.01)

(58) Field of Classification Search
CPC ............. H04L 63/1425; H04L 63/1416; H04L 61/1511; H04L 63/1441; H04L 2463/061; H04L 63/1483
See application file for complete search history.

(56) References Cited

U.S. PATENT DOCUMENTS

| | | | |
|---|---|---|---|
| 9,910,986 B1 | 3/2018 | Saxe et al. | |
| 10,778,702 B1* | 9/2020 | Huang | H04L 63/0236 |
| 2017/0243028 A1 | 8/2017 | LaFever et al. | |
| 2018/0063161 A1 | 3/2018 | Kopp et al. | |
| 2018/0183821 A1* | 6/2018 | Schneider | G06F 16/285 |
| 2018/0232526 A1 | 8/2018 | Reid et al. | |
| 2019/0238576 A1* | 8/2019 | Weber | H04L 63/0245 |

* cited by examiner

*Primary Examiner* — Suraj M Joshi
*Assistant Examiner* — Jaren Means
(74) *Attorney, Agent, or Firm* — Grant M. McNeilly

(57) ABSTRACT

A method for identification of malicious domains is provided. The method extracts a set of domain information from one or more input streams. The set of domain information includes a set of domains and a set of domain characteristics describing each domain. The method clusters the set of domains to generate a set of campaign clusters of related domains. The clusters are based on the set of domain characteristics. The method modifies the set of campaign clusters with a set of threat intelligence ratings to generate a set of enriched campaign clusters. A portion of the set of threat intelligence ratings correspond to one or more domains within the set of campaign clusters. The method determines a cluster designation for each campaign cluster of the set of enriched campaign clusters and distributes the cluster designations for each campaign cluster to one or more threat intelligence resource.

20 Claims, 7 Drawing Sheets

DOMAIN CLUSTERING FOR MALICIOUS CAMPAIGN IDENTIFICATION

BACKGROUND

Threat identification systems may identify and correlate indicators of compromise. Such threat identification systems may correlate similar indicators of compromise which are of a limited number of types. Based on indicators of compromise and activity records, threat identification systems may focus on identification of bad actors via information which can personally identify an individual.

SUMMARY

According to an embodiment described herein, a computer-implemented method for identification of malicious domains is provided. The method extracts a set of domain information from one or more input streams. The set of domain information includes a set of domains and a set of domain characteristics describing each domain. The method clusters the set of domains to generate a set of campaign clusters of related domains. The clusters are based on the set of domain characteristics. The method modifies the set of campaign clusters with a set of threat intelligence ratings to generate a set of enriched campaign clusters. A portion of the set of threat intelligence ratings correspond to one or more domains within the set of campaign clusters. The method determines a cluster designation for each campaign cluster of the set of enriched campaign clusters and distributes the cluster designations for each campaign cluster to one or more threat intelligence resource.

DETAILED DESCRIPTION

Figure 1:
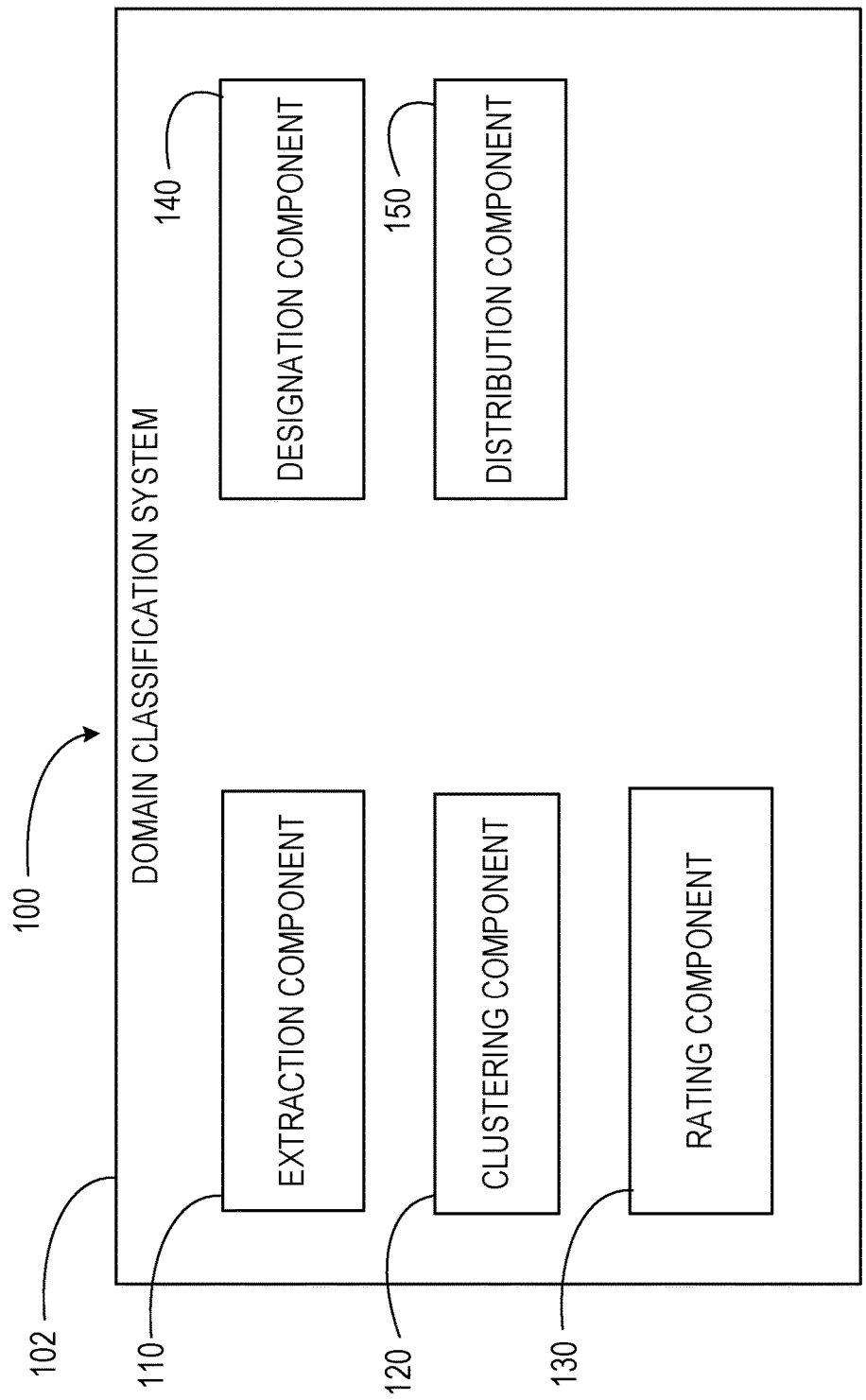
FIG. 1 depicts a block diagram of a computing environment for implementing concepts and computer-based methods, according to at least one embodiment.

The present disclosure relates generally to methods for threat identification, but not exclusively, to a computer-implemented method for identification of malicious domains and domains involving malicious campaigns. The present disclosure relates further to a related system for threat identification, and a computer program product for operating such a system.

Bad actors often try to remain anonymous. Malicious activities of bad actors may be progressively harder to identify given data protection and anonymization regulations to which data storage and tracking may be subject. For example, the European General Data Protection Regulation (GDPR) came into force in May of 2018. Personal information which was readily available in the WhoIs registration data may be subject to removal under the GDPR, and therefore be missing when trying to identify bad actors associated with malicious campaigns or security threats, such as phishing attacks, spam, and malware distribution. In some instances, sixty percent of WhoIs data, such as a contact email address or telephone number, may be deleted, anonymized, or pseudo-anonymized as a result of GDPR compliance. Such regulations, whether in Europe or other countries, may make previous solutions for identifying malicious actors difficult or largely ineffective.

Embodiments of the present disclosure enable identification of domains registered for malicious purposes before they can be used in malicious campaigns. Embodiments of the present disclosure identify malicious campaigns without use of information which personally identifies an individual. Domain identifying information may not be included in identity protection and anonymization regulations like the GDPR. By identifying and clustering malicious domains, embodiments of the present disclosure provide a technical solution for problems facing other current detection and malicious activity prevention methods. Embodiments of the present disclosure enable malicious campaign identification using machine learning techniques to identify malicious domains, campaigns, and actors using data and methods which do not run afoul of data and identity protection regulations. Such embodiments compensate for classification and identification loss due to regulatory compliance. Embodiments of the present disclosure describe methods and systems for clustering similar activities within a defined duration or timeframe to similarly identify an onset of malicious campaigns. Embodiments enable identification of previously unknown registration patterns and activities of bad actors. Leveraging these new patterns and pattern identification provides improvement in detection, detection timing, and detection coverage.

Some embodiments of the concepts described herein may take the form of a system or a computer program product. For example, a computer program product may store program instructions that, when executed by one or more processors of a computing system, cause the computing system to perform operations described above with respect to the computer implemented method. By way of further example, the system may comprise components, such as processors and computer readable storage media. The computer readable storage media may interact with other components of the system to cause the system to execute program instructions comprising operations of the computer implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may comprise a domain classification system 102. The domain classification system 102 may comprise an extraction component 110, a clustering component 120, a rating component 130, a designation component 140, and a distribution component 150. The extraction component 110 extracts domain information from input streams and generates time-based caches. The clustering component 120 clusters a set of domains within the domain information to generate a set of campaign clusters of related domains. The rating component 130 modifies the set of campaign clusters with a set of threat intelligence ratings to generate a set of enriched campaign clusters. The designation component 140 determines a cluster designation for each campaign cluster of the set of enriched campaign clusters. The distribution component 150 distributes campaign designations along with associated domains and enriched campaign clusters to one or more threat intelligence resource. Although described with distinct components, it should be understood that, in at least some embodiments, components may be combined or divided, or additional components may be added, without departing from the scope of the present disclosure.

Figure 2:
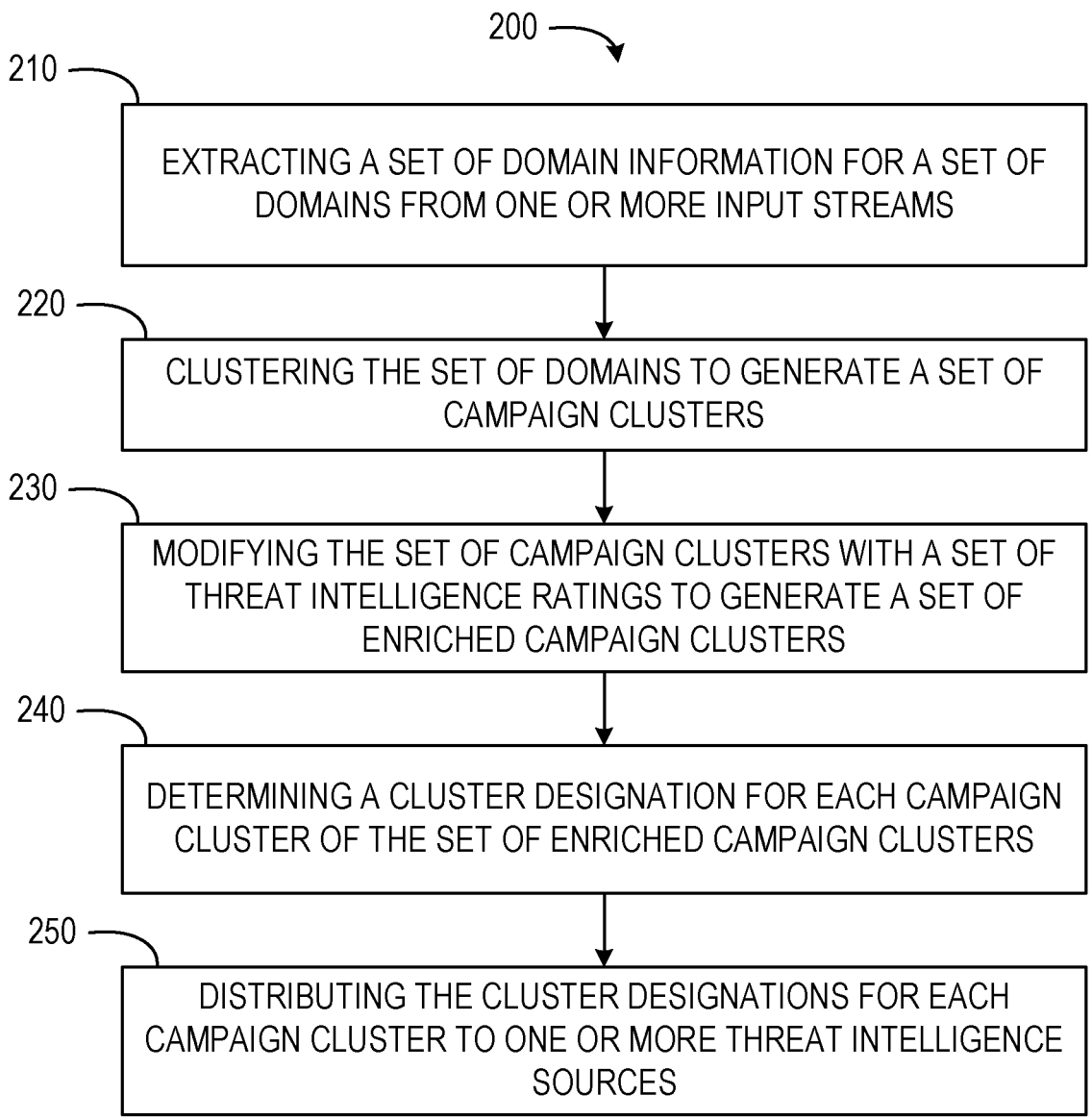
FIG. 2 depicts a flow diagram of a computer-implemented method for domain clustering and malicious campaign identification, according to at least one embodiment.

Referring now to FIG. 2, a flow diagram of a computer-implemented method 200 is shown. The computer-implemented method 200 is a method for domain clustering and malicious campaign identification. In some embodiments, the computer-implemented method 200 may be performed by one or more components of the computing environment 100, as described in more detail below.

At operation 210, the extraction component 110 extracts a set of domain information from one or more input streams. In some embodiments, the set of domain information includes a set of domains and a set of domain characteristics. The set of domain characteristics may describe each domain, such each domain is associated with one or more domain characteristics of the set of domain characteristics. The one or more input streams may be sources of new or unknown domains. For example, domains which have been newly registered, updated, or re-registered may be included in the one or more input streams. The one or more input streams may also include domains for hosts which have newly created certificates. The one or more input streams may include certification services or resources (e.g., databases on which domain certificates are generated or stored), domain registration services or resources, domain hosting services or resources, domain crawling services, combinations thereof, or any other source of domain information described herein.

In some embodiments, the domain information includes a domain name, a first seen date, a registration time, an update date, an update time, a number of registrations, combinations thereof, and any other suitable information or aspects describing or defining an instance of a domain. Where a domain has been registered more than once, the domain information may include information for the first registration of the domain and any subsequent registration of the domain. The domain information may also include time information indicating a length of time the domain has been registered. In the event of multiple registrations, the domain information may include time information indicating a length of time for each registration of the domain.

In some embodiments, once the extraction component 110 receives, accesses, or extracts the domain information, the extraction component 110 may correlate the domain information using data from differing input streams. For example, a first input stream may include data from a registrar of domains and a second input stream may include information from a WhoIs database or resource. The domain information of the second input stream may be searchable via a domain key or identifier. Each record within the second input stream may contain information such as a registrar name, which WhoIs server is used, which name servers are used for the domain name lookup, a time and date of registration, a registrant country, combinations thereof, and any other suitable domain information.

In some instances, data fields for a specified domain may be missing from a specified input stream. The data fields may be empty, missing, or anonymized due to statutory or other regulatory concerns. The extraction component 110 may correlate or combine information from differing input streams to enrich the domain information and generate enriched domain information for each domain. The extraction component 110 may generate the enriched domain information by processing or parsing each input stream. In some embodiments, the enriched domain information includes server names, registrant city, registrant country, registrant email, registrant name, registrant state, registrar name, WhoIs server, creation date, update date, first registration date, last registration date, combinations thereof, or any other suitable domain information. The enriched domain information may be stored in a structured format (e.g., JSON) and passed to one or more cache or one or more component of the domain classification system 102. In some embodiments, the extraction component 110 may normalize the enriched domain information during the processing and storage operations.

In some embodiments, the extraction component 110 generates a time-based cache for the set of domains. The time-based cache stores the set of domain information within a specified time range. The time-based cache may store the domain information discussed above and corresponding time information relating to the domain. In some instances, the time-based cache stores domain information from newly registered or updated domains, domain creation dates, domain update dates, reception dates (e.g., a time at which the extraction component 110 received the domain or the domain appeared in an input stream). The time-based cache may also store a record type or domain type, indicating an input stream from which the domain or domain information was extracted. In some embodiments, the time-based cache stores enriched domain information. The time-based cache may also include time information for the enriched domain information, indicating a time at which the domain information was combined with additional information to generate the enriched domain information. For example, enriched domain information from a newly registered or updated domain may use a domain creation date or domain updated date. The time-based cache may store the domain information or enriched domain information within a specified time range. Such storage of data may reduce redundancies by updating duplicate domain information or domains within a most recent time range. The time-based cache may be generated as a searchable data structure, such that records within the time-based cache may be searchable by date, type, and any other suitable characteristics or aspects of the domain information.

At operation 220, the clustering component 120 clusters the set of domains to generate a set of campaign clusters of related domains. In some embodiments, the set of domains are clustered based on the set of domain characteristics. The clustering component 120 may cluster the set of domains based on the domain information or enriched domain information received from the one or more input streams. The clustering component 120 may cluster the set of domains using a hierarchical clustering process. In some instances, the clustering component 120 clusters the set of domains based on the domain information, enriched domain information, and a specified time window. The campaign clusters may be groups or clusters of domains that may be identified or determined as belonging to a single campaign based on common domain characteristics, domain information, enriched domain information, and any other suitable information. In some embodiments, the clustering component 120 clusters the set of domains such that commonalities between domains within a campaign cluster are stronger than commonalities between domains within two or more distinct or different campaign clusters.

In some embodiments, the clustering component 120 receives the domain information or enriched domain information from the extraction component 110. The domain information or enriched domain information may include the set of domains (e.g., a domain identifier) and domain characteristics associated with each domain of the set of domains. In embodiments where the time-based cache is available, the clustering component 120 clusters the set of domains based on the set of domain information and the specified time range of the time-based cache.

In some embodiments, the clustering component 120 may iteratively or continuously cluster domains upon receiving additional domain information. In such embodiments, the extraction component 110 monitors the one or more input streams to identify subsequent domain information including a subsequent set of domains. The extraction component 110 may continuously monitor the one or more input streams by receiving domain information as the domain information is made available by each input stream. For example, once a new or unknown domain is registered or information about a known domain is changed or updated at a resource of an input stream, the extraction component 110 may extract the domain information associated with the new or unknown domain or the updated information for the known domain. The extraction component 110 may also periodically query, poll, or crawl the one or more input streams to determine if additional domain information is available for new or unknown domains or updated domain information is available for known domains. When such information is available, the extraction component 110 may extract the domain information from the one or more input streams. In such instances, the periodic access and extraction of domain information may be performed based on a time interval, in response to an indication of new or updated domain information from an input stream, or any other suitable basis.

The clustering component 120 then iteratively clusters the set of domain clusters to incorporate the subsequent set of domains into one or more campaign clusters of the set of campaign clusters. In some embodiments, the clustering component 120 iteratively clusters the set of domain clusters based on a time interval, based on determining sufficient new domain information is available, based on receiving new or updated information for one or more domains which have already been assigned a cluster, combinations thereof, or any other suitable iteration. As explained below, the clustering component 120 may iteratively cluster the set of domain clusters based on subsets of domain information and enriched domain information.

At operation 230, the rating component 130 modifies the set of campaign clusters with a set of threat intelligence ratings to generate a set of enriched campaign clusters. The rating component 130 may take generated clusters and correlate domains within each cluster with threat intelligence information to generate the threat intelligence ratings and modify the campaign clusters. The threat intelligence ratings may be obtained from threat intelligence feeds. These feeds may contain up-to-date information on current security threats. For example, threat intelligence feeds may include information on which hosts and domains are being used in spam, malware, or phishing attacks. The threat intelligence feeds may include IP information from firewall logs, information from intrusion prevention systems, known domain generation algorithm domains, and other suitable threat information. The threat intelligence feeds may also include social media sources, which may be monitored for threat intelligence relevant information, such as reports of domains or hosts involved in hacks or other malicious activities.

In some embodiments, a portion of the set of threat intelligence ratings correspond to one or more domains within the set of campaign clusters. Once campaign clusters have been determined, the rating component 130 may enrich the campaign clusters with external threat intelligence data, such as from a ratings cache. The rating component 130 may also enrich the campaign clusters using internal cluster correlations and cluster statistics. Internal cluster correlations may include a percentage of domains in a non-time cluster which have also been in a time-based cluster, a percentage of domains in a non-time cluster which are also present in other non-time clusters (e.g., cluster cross over), and an average number of different time clusters in which each domain in the set of domains is also present. Internal cluster correlations may also include an indication of whether a privacy protection service has been used to redact personal information from the WhoIs data, an average length of domains in a cluster, a variance of domain length, a number of different domains in a cluster, and any other suitable correlations. Each cluster may be enriched with various ratings, which may be used in cluster labeling or designation, and updating of threat intelligence databases or resources. Some cluster ratings may be extracted or retrieved from a threat intelligence rating or score cache. Other threat intelligence ratings may contain statistics for domains in the campaign cluster. For example, the domain statistics may include average domain length, average domain activity, time of activity, or other statistics. Such statistics may be represented by a floating-point value.

At operation 240, the designation component 140 determines a cluster designation for each campaign cluster of the set of enriched campaign clusters. In embodiments where the rating component 130 generates a threat intelligence rating for the campaign clusters, the designation component 140 may identify each campaign cluster or enriched campaign cluster. The designation component 140 may then access a rating cache, time-based cache, threat intelligence cache, metadata, or any other suitable and relevant data structure including the threat intelligence ratings. The designation component 140 may then identify threat intelligence ratings corresponding to each campaign cluster or enriched campaign cluster. For example, the time-based cache or metadata may include a threat intelligence rating as a bit, zero or one, associated with an identifier for a domain, a campaign cluster, or an enriched campaign cluster.

In some embodiments, the designation component 140 classifies the set of threat intelligence ratings to generate a set of threat classes. Each threat class may indicate a campaign nature. The designation component 140 may be associated with a trained classifier to categorize a cluster as malicious or benign, and to further assign a campaign type or label to the cluster. For example, the trained classifier may be included in the designation component 140 or the rating component 130. The designation component 140 may then apply a threat class of the set of threat classes to each campaign cluster. In some instances, the set of threat classes includes a malicious class and a benign class. The set of threat classes may also include a compromised class (e.g., a benign domain which has been hacked) and any other suitable classes indicating a domain or campaign cluster as suspicious, likely malicious, likely benign, or other designations.

In some embodiments, the designation component 140 labels each campaign cluster, or domains included within each campaign cluster, based on the determined cluster designation. In some instances, the designation component 140 labels the campaign clusters as either good (e.g., benign) or bad (e.g., malicious). In the case of a malicious campaign, the designation component 140 may generate a sub-label indicating a type of malicious activity associated with domains of the campaign cluster. For example, the designation component 140 may label campaign clusters with types including spam, phishing, or other types of malicious activity. In some instances, the designation component 140 or the rating component 130 employs machine learning to perform the classification of the threat intelligence ratings of operation 230. The threat intelligence ratings may be passed to the trained classifier, described above, which returns a class to which each campaign cluster belongs. For example, classes may include spam, phishing, malware, benign, or other suitable classes. The campaign cluster may then be augmented with the classification to enrich the campaign clusters. In some instances, the enriched campaign clusters, along with indicators of ratings, classes, or cluster designations, are stored in a historical cluster data structure. The historical cluster data structure may then be used to train clusters and classifiers, or to update previously trained clusters and classifiers.

In some embodiments, classifiers are trained on the historical cluster data structure, including previously classified and labeled campaign clusters. The classifiers may be trained on historical clusters for given time ranges, such as from domain information received between two years and one year ago. Domains within the historical data structures may be separated according to malicious activities, for training purposes. It may be determined whether domains within the historical cluster data structures have been involved in some form of malicious activity, such as distribution of spam, malware, or phishing communications. Further, it may be determined whether domains have been used as command and control servers. If the domains in a given campaign cluster do not show any current or historical indicators of maliciousness, the cluster may be regarded as good for training, and assigned to a benign class of clusters. If the domains in the cluster have been observed in malicious activity, current or historical, the cluster may be regarded as a bad cluster for training, and may be labeled with a class identifier indicating a type of reported malicious activity. Once the domains in the historical cluster data structure have been labeled, classifiers may be trained. Classifiers may be trained through machine learning techniques including decision trees, support vector machines, neural networks, or any other suitable machine learning methods or techniques. After training the classifiers on historical domain information within the given time range, the domains of the training clusters classified or labeled by the classifier may be checked against current and historical threat intelligence data to verify the efficacy of the classifier. In some embodiments, training may be carried out at regular intervals to ensure the classifier is up-to-date with the latest types of malicious campaigns.

At operation 250, the distribution component 150 distributes the cluster designations for each campaign cluster to one or more threat intelligence sources. In some embodiments, the distribution component 150 distributes cluster designations identified as malicious to one or more threat intelligence sources. The distribution component 150 may generate a message, data structure, or other transmission identifying domains within each campaign cluster and the malicious cluster designation for each campaign cluster to threat intelligence portals, databases, or network resources. In some instances, the cluster designations are distributed as threat intelligence updates. For example, the threat intelligence updates may be distributed as customer installations or updates to definition files for threat identification or antivirus applications.

Figure 3:
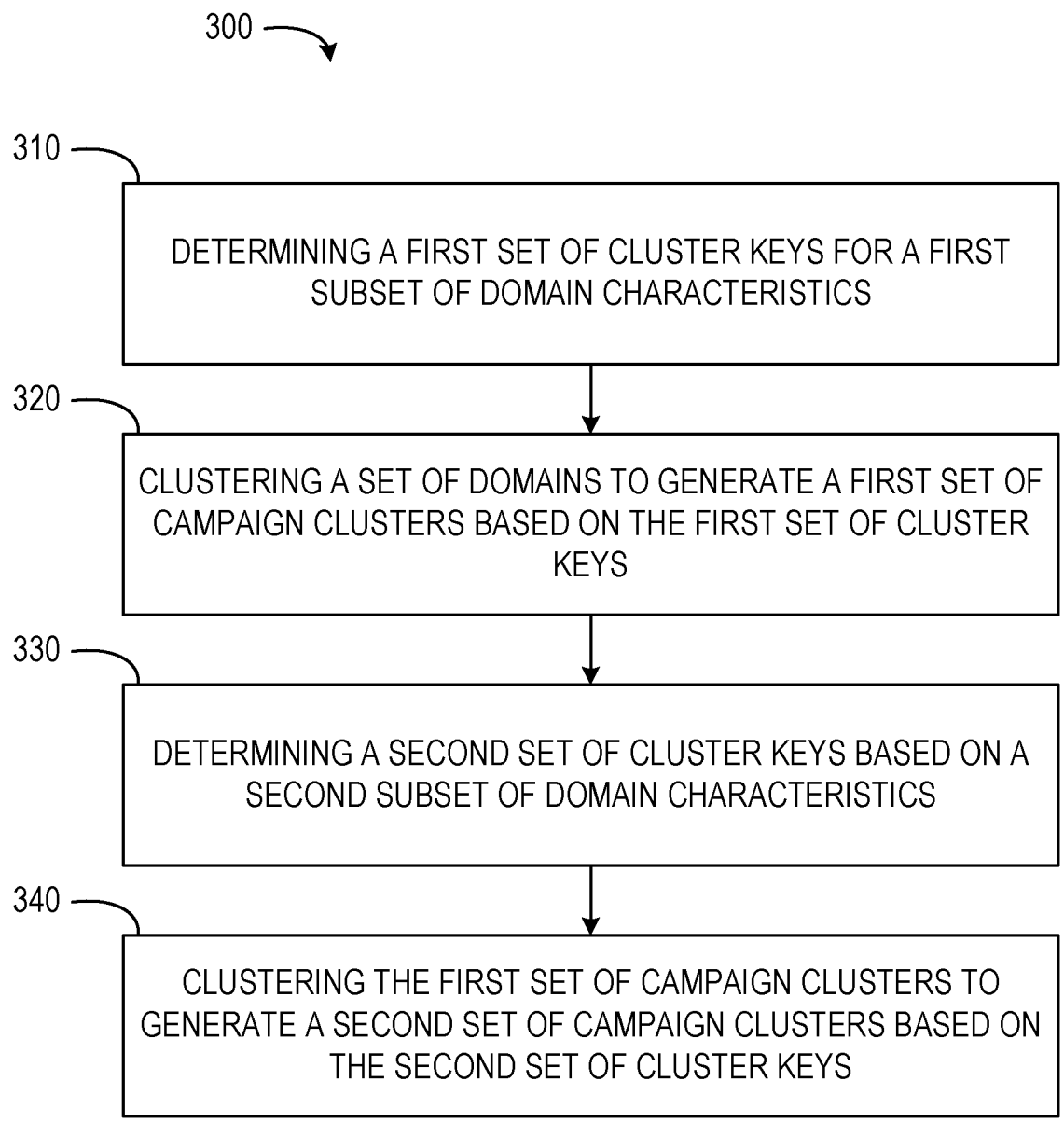
FIG. 3 depicts a flow diagram of a computer-implemented method for domain clustering and malicious campaign identification, according to at least one embodiment.

FIG. 3 shows a flow diagram of an embodiment of a computer-implemented method 300 for domain clustering and malicious campaign identification. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the clustering component 120 determines a first set of cluster keys for a first subset of domain characteristics of the set of domain characteristics. In some embodiments, the clustering component 120 splits the set of domain characteristics into subsets of data items. Each subset of data items may relate to a specific cluster key or set of cluster keys. A cluster key may comprise a set of records from the domain information or the enriched domain information. For example, the first set of cluster keys may include records containing cluster characteristics indicating name servers, registrant city, registrant country, registrant email, registrant name, registrant state, registrar name, WhoIs server, and created date. The records may include blanked or anonymized fields based on regulatory compliance issues. Some of the fields may be filled with non-regulated content. The cluster key or set of cluster keys may utilize a feature of bulk registration used when registering multiple domains for a campaign. While the domains or domain identification may vary for a campaign, all or a portion of the domain characteristics within the first cluster key or first set of cluster keys may remain the same for all or a portion of the domains or domain identification.

In operation 320, the clustering component 120 clusters the set of domains to generate a first set of campaign clusters based on the first set of cluster keys. The clustering component 120 may parse the domain information associated with the set of domains to determine a subset of domains associated with domain characteristics matching domain characteristics of the first set of cluster keys. Each domain within a cluster may be associated with at least a portion of the first set of cluster keys, such that all of the domains within a cluster share some level of similarity or commonality based on domain characteristics. For example, where the first set of cluster keys includes domain characteristics of name servers, registrant city, registrant country, registrant email, registrant name, registrant state, registrar name, WhoIs server, and created date, the first set of campaign clusters may include all of the domains having at least one domain characteristic matching the name servers, registrant city, registrant country, registrant email, registrant name, registrant state, registrar name, WhoIs server, or created date.

In some embodiments, the first set of campaign clusters includes a single cluster comprising all of the domains of the set of domains. The first set of campaign clusters may also include a plurality of clusters, splitting at least a portion of the domains into separate clusters. Some domains of the set of domains may be clustered into more than one campaign clusters of the first set of campaign clusters. In some instances, the first set of campaign clusters represent an initial clustering of the set of domains. Where the first set of campaign clusters represents an initial clustering, the clustering component 120 may generate clusters hierarchically, subdividing clusters into smaller groups of domains that have stronger commonalities among them.

In operation 330, the clustering component 120 determines a second set of cluster keys based on a second subset of domain characteristics of the set of domain characteristics. In some embodiments, the second set of cluster keys may be a subset of domain characteristics or cluster keys. The second set of cluster keys may further define commonality between domains in a cluster. For example, the second set of cluster keys may include n-grams present in each domain label or identification within a cluster, domain Top-Level Domains (TLD), patterns within a domain (e.g., hyphens or numbers), phishing properties (e.g., a similarity to known top brands, companies, or Trademarks), registration times (e.g., hour or minute), combinations thereof, or any other suitable characteristic or sub-characteristic. In some embodiments, for each set of enriched domain items or characteristics relating to a subkey, the data may be further split into subsets defined by a commonality produced by the subset. The domains identified in this lowest subset may be related to each other in a manner suitable for identification as part of a campaign. For example, the second set of cluster keys may include subkeys for "n-gram," "TLD," and "time." In this example, the clustering component 120 may subdivide the domains included in the first set of campaign clusters (e.g., a single campaign cluster) into the second set of campaign clusters (e.g., a plurality of campaign clusters).

In operation 340, the clustering component 120 clusters the first set of campaign clusters to generate a second set of campaign clusters based on the second set of cluster keys. The clustering component 120 may generate the second set of campaign clusters by determining or isolating domains, within the first set of campaign clusters, which are associated with a domain characteristic matching at least one of the subkeys included in the second set of cluster keys. For example, where the second set of cluster keys comprise "n-gram," "TLD," and "time," the clustering component 120 may generate three campaign clusters within the second set of campaign clusters. The first cluster may comprise domains associated with the n-gram specified by the "n-gram" cluster key of the second set of cluster keys. The second cluster may comprise domains associated with top-level domains specified by the "TLD" cluster key of the second set of cluster keys. The third cluster may comprise domains associated with a time or time range specified by the "time" cluster key. The subdivision of the first set of campaign clusters into the second set of campaign clusters may generate or represent a hierarchical relationship or hierarchical clustering, as referenced above.

In some embodiments, as noted above, the clustering component 120 may iteratively cluster the set of domains until clusters representing a lowest level relationship or smallest group of domains is achieved. For example, a first two clustering iterations may result in the first set of campaign clusters and the second set of campaign clusters. The clustering component 120 may then further subdivide at least a portion of the second set of campaign clusters by identifying additional sets of cluster keys or subkeys. For example, within the first cluster (e.g., the n-gram cluster) of the second set of clusters, the clustering component 120 may identify n-grams of "cash," "priv," and "game." As noted above, with each subdivision of clusters, some domains may appear in multiple clusters based on association with domain characteristics matching cluster keys or subkeys. For example, a domain of "privatecash.net" may be included in campaign clusters for a subkey n-gram of "cash," a subkey n-gram of "priv," and a subkey TLD of ".net." This crossover may be used as a measure of reliability in embodiments described below.

In some embodiments, the clustering component 120 may perform further iterative clustering operations to move or consolidate domains within overlapping clusters. For example, where the "privatecash.net" domain is included in campaign clusters for subkey "cash" and subkey "priv," which are both hierarchically related to the subkey "n-gram," the clustering component may consolidate these instances into a single campaign cluster and remove instances of the "privatecash.net" domain from smaller campaign clusters within a single hierarchical line (e.g., the "n-gram" subkey). Similarly, where campaign clusters under the "time" subkey represent consecutive minutes or seconds, the clustering component 120 may consolidate the two or more campaign clusters associated with the consecutive times. In some instances, the clustering component 120 applies a set of consolidation rules to determine whether to consolidate campaign clusters. For example, where times of two campaign clusters have a time interval of two or more minutes separating the campaign clusters, the two campaign clusters may remain separate. Two campaign clusters closer than two minutes together may be consolidated.

In some embodiments, the clustering component 120 continues iterative clustering (e.g., subdividing clusters, consolidating clusters, etc.) until a threshold cluster size is reached. For example, the clustering component 120 may continue iterative clustering of domains until campaign clusters include five or fewer distinct domains. Although discussed with respect to a specified number of domains, it should be understood that the threshold for the clustering component 120 may be any suitable number, or may be dynamically determined based on an initial number of domains, a similarity of domain names, or any other suitable method.

Figure 4:
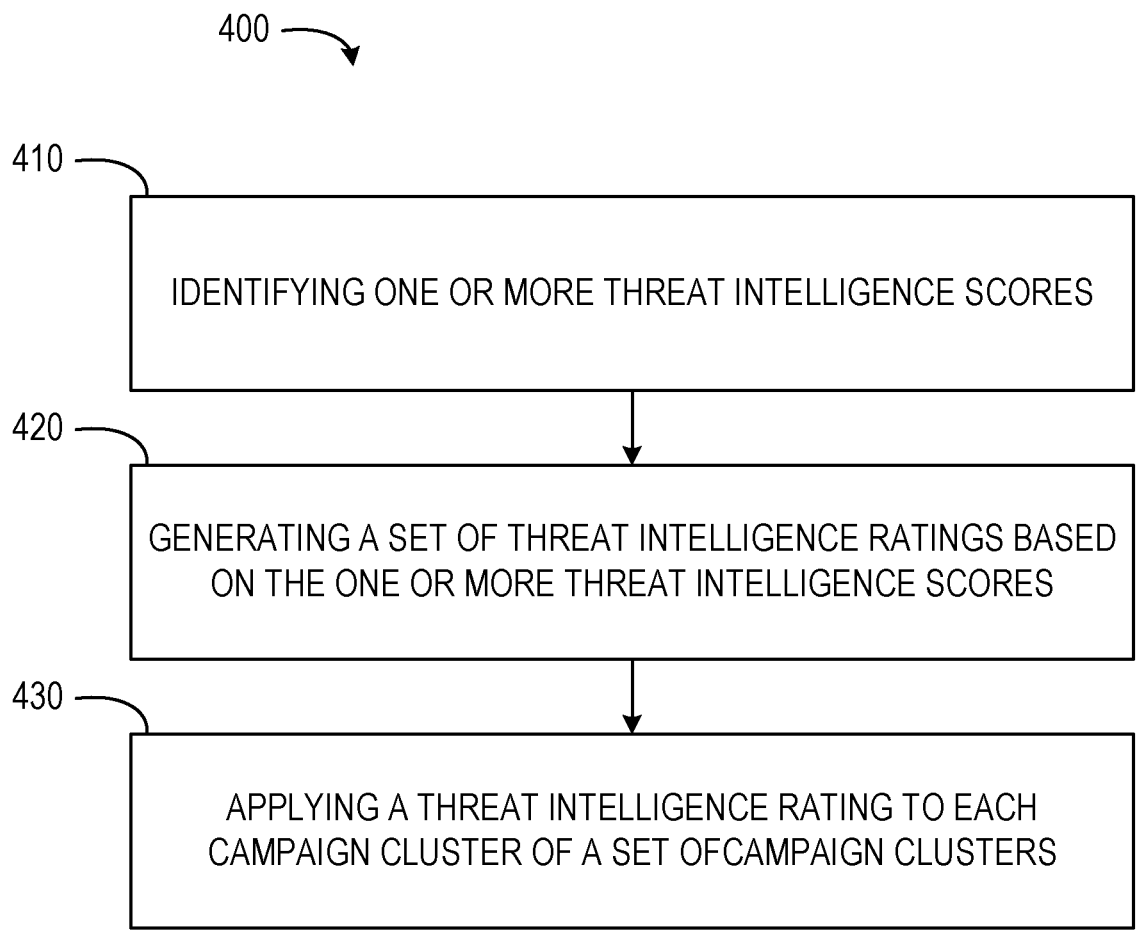
FIG. 4 depicts a flow diagram of a computer-implemented method for domain clustering and malicious campaign identification, according to at least one embodiment.

FIG. 4 shows a flow diagram of an embodiment of a computer-implemented method 400 for domain clustering and malicious campaign identification. The method 400 may be performed by or within the computing environment 100. In some embodiments, the method 400 comprises or incorporates one or more operations of the methods 200 or 300. In some instances, operations of the method 400 may be incorporated as part of or sub-operations of the methods 200 or 300.

In operation 410, the rating component 130 identifies one or more threat intelligence scores. The threat intelligence scores may be associated with one or more domain characteristics. Each threat intelligence score may be a qualitative or quantitative indicator of a current maliciousness or likelihood that a given domain characteristic is associated with a threat or malicious activity. The threat intelligence scores may be generated based on the domain characteristics being associated with previous threats, previous malicious activity, previous threat campaigns, known malicious entities or bad actors, combinations thereof, or any other indicator of suspicious or malicious activity. Threat intelligence scores may be generated continuously, at given intervals, or upon receiving information indicating malicious activity (e.g., on demand). For example, the threat intelligence scores may be generated or updated at specified time intervals, such as hourly.

In some embodiments, the rating component 130 identifies the one or more threat intelligence scores by accessing a threat intelligence resource or threat intelligence source. For example, the rating component 130 may identify scores for a WhoIs registrar, a registrant email, a registrant country, a TLD, an n-gram or n-gram pattern, or any other domain characteristic or enriched domain information. Some ratings or scores may be definite indicators of malicious activity, such as a threat intelligence score for a TLD. Other ratings or scores may appear neutral, such as a number of domains in a cluster. In some embodiments, the rating component 130 identifies the one or more threat intelligence scores during extraction of the domain information. The rating component 130 may also identify the one or more threat intelligence scores during enrichment of the domain information, during clustering of the domains, or during modification of the set of campaign clusters.

In operation 420, the rating component 130 generates the set of threat intelligence ratings based on the one or more threat intelligence scores. The rating component 130 may generate the set of threat intelligence ratings as a quantification or qualification of a domain or a campaign cluster being associated with malicious activity. For example, the set of threat intelligence ratings may incorporate threat intelligence scores indicating domains or domain characteristics associated with spam, malware or phishing attacks, IP information from firewall logs, information from intrusion prevention systems, known domain generation algorithm domains, combinations thereof, and any other suitable threat intelligence scores. In some embodiments, threat intelligence ratings are generated as a binary rating. A given data item, domain, or campaign cluster may be provided a value of zero where the threat intelligence scores indicate that the given data item has not been seen in or associated with malicious activity. A given data item, domain, or campaign cluster may be provided a value of one to indicate the given data item is strongly related to malicious activity.

For example, a TLD threat intelligence score may be generated based on how often a given TLD has been seen in recent malicious campaigns or used in benign email data. An n-gram threat intelligence score may be based on how often specific domain label n-grams are used in malicious campaigns or used in benign scenarios. Threat intelligence scores for WhoIs data items (e.g., registrar, name server, WhoIs server, registrant country, etc.) may be generated based on how many malicious domains have been registered by a particular registrar, registrant country or the like. The rating component 130 may generate a threat intelligence rating for a given domain or campaign cluster based on the presence, commonality, or weight of the scored data characteristics (e.g., the TLD, the n-gram, and the WhoIs data items). In some instances, the rating component 130 generates a threat intelligence rating by averaging threat intelligence scores for each domain characteristic associated with a domain or common to domains within a campaign cluster. The rating component 130 may also generate threat intelligence ratings using weighted averages, ratios, or any other suitable method for qualification or quantification of a given set of scores.

In operation 430, the rating component 130 applies a threat intelligence rating to each campaign cluster of the set of campaign clusters. The rating component 130 may apply the threat intelligence rating for each campaign cluster to metadata associated with or defining the campaign cluster. In some instances, the rating component 130 applies the threat intelligence rating as a bit-wise modification to metadata or data defining a given campaign cluster within a threat intelligence resource, database, or data structure. In some instances, the rating component 130 applies the threat intelligence rating to the time-based cache, or any other cache or data structure containing information relating to the campaign clusters.

Figure 5:
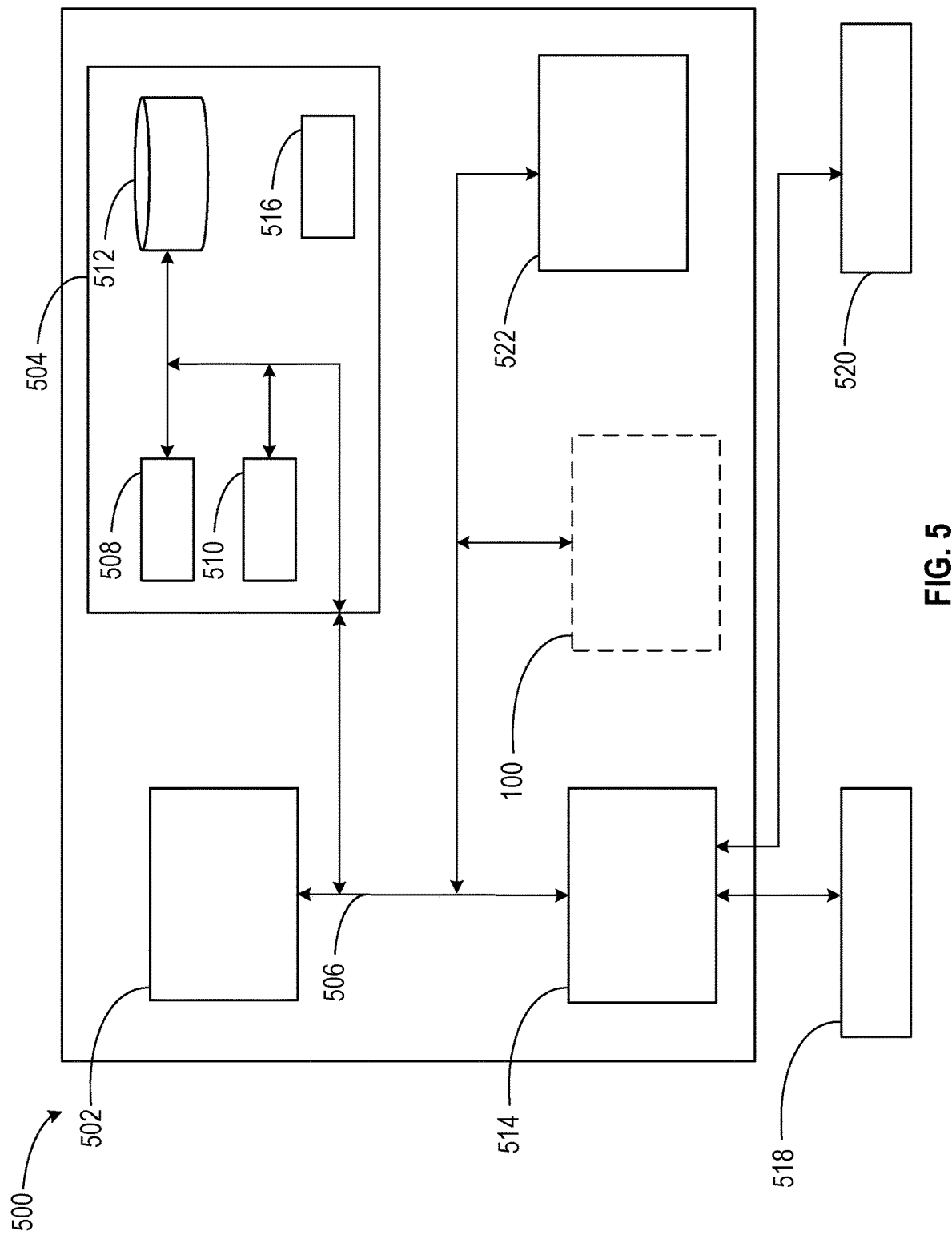
FIG. 5 depicts a block diagram of a computing system for domain clustering and malicious campaign identification, according to at least one embodiment.

Embodiments of the present disclosure may be implemented together with virtually any type of computer, regardless of the platform being suitable for storing and/or executing program code. FIG. 5 shows, as an example, a computing system 500 (e.g., cloud computing system) suitable for executing program code related to the methods disclosed herein and for domain clustering and malicious campaign identification.

The computing system 500 is only one example of a suitable computer system and is not intended to suggest any limitation as to the scope of use or functionality of embodiments of the present disclosure described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors 502 (e.g., processing units), a system memory 504 (e.g., a computer-readable storage medium coupled to the one or more processors), and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random-access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, the system memory 504 may include at least one program product having a set (e.g., at least one) of program modules that are configured to carry out the functions of embodiments of the present disclosure.

The program/utility, having a set (at least one) of program modules 516, may be stored in the system memory 504 by way of example, and not limiting, as well as an operating system, one or more application programs, other program modules, and program data. Program modules may include one or more of the extraction component 110, the clustering component 120, the rating component 130, the designation component 140, and the distribution component 150, which are illustrated in FIG. 1. Each of the operating systems, one or more application programs, other program modules, and program data or some combination thereof, may include an implementation of a networking environment. Program modules 516 generally carry out the functions and/or methodologies of embodiments of the present disclosure, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that, although not shown, other hardware and/or software components could be used in conjunction with computer system/server 500. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Figure 6:
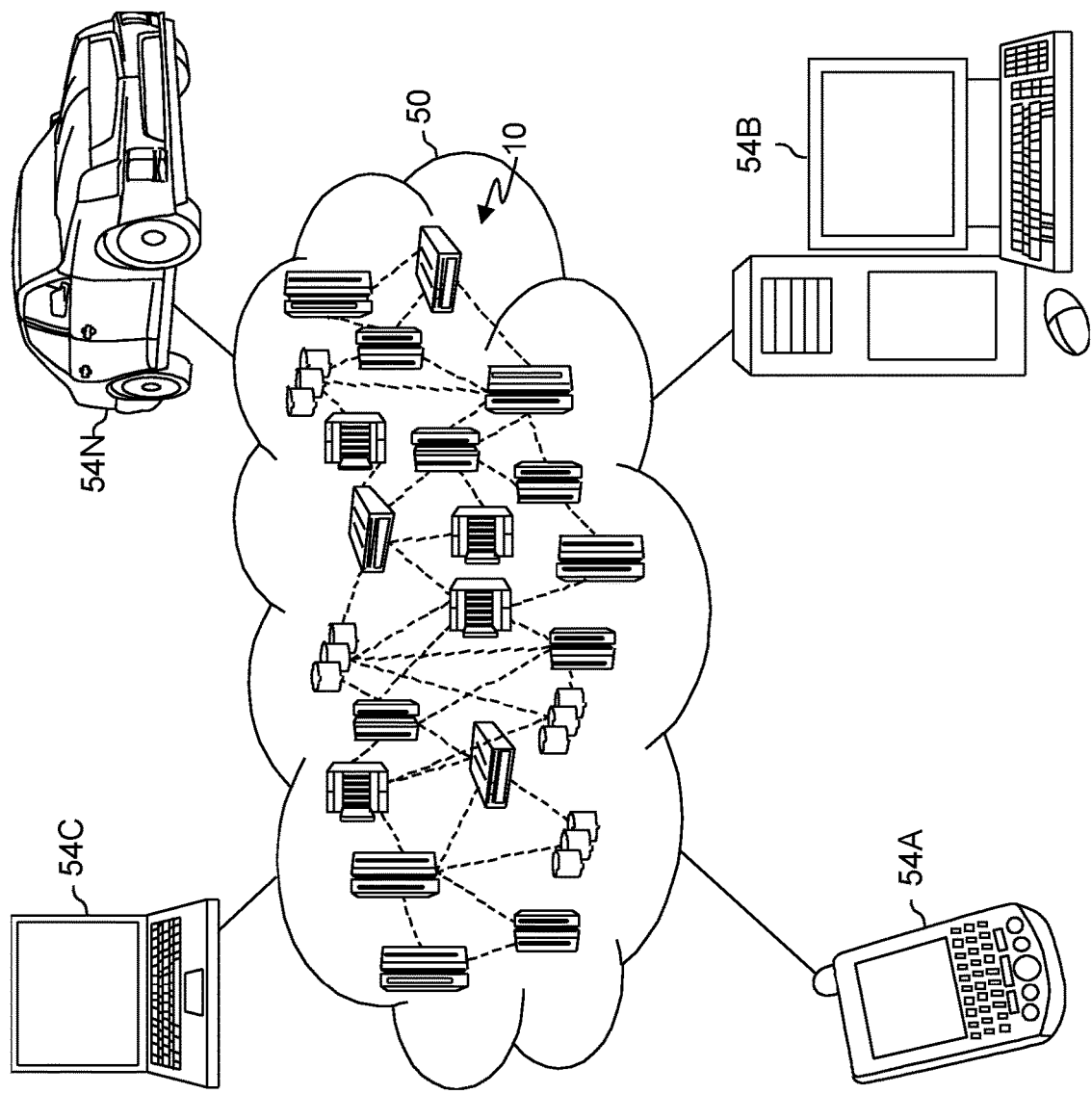
FIG. 6 is a schematic diagram of a cloud computing environment in which concepts of the present disclosure may be implemented, in accordance with an embodiment of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 7:
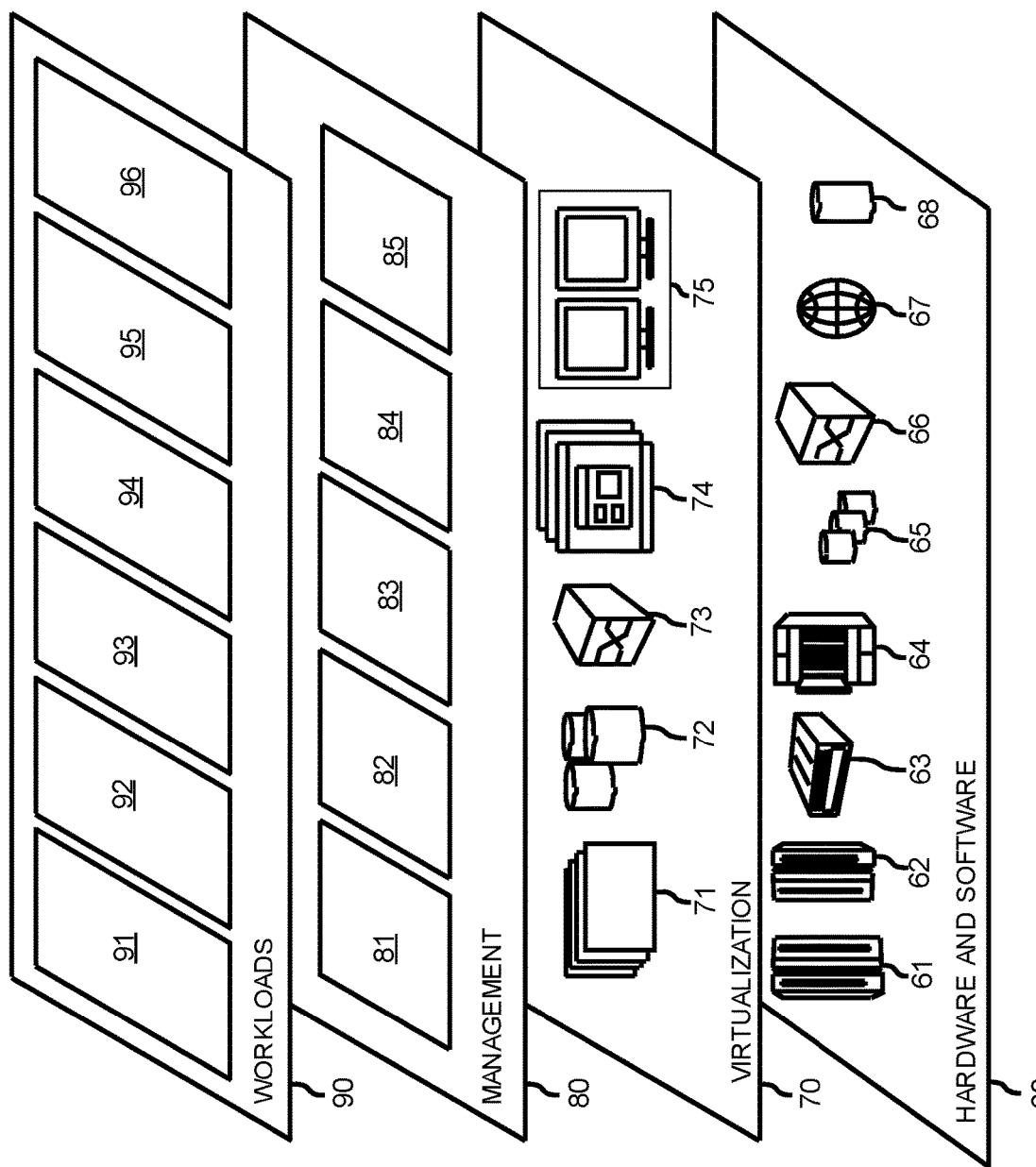
FIG. 7 is a diagram of model layers of a cloud computing environment in which concepts of the present disclosure may be implemented, in accordance with an embodiment of the present disclosure.

Referring now to FIG. 7, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network traffic direction processing 96.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   extracting a set of domain information from a plurality of input streams, the set of domain information including a set of domains and a set of domain characteristics describing each domain, the plurality of input streams includes a first input stream of one or more domain registrars representing newly registered domains and a set of second input streams of one or more non-domain registrar sources containing domain information;
   generating enriched domain information by correlating the set of domain information from the first input stream and the set of second input streams, the enriched domain information inserting missing data into domain information of a specified input stream from another input stream of the plurality of input streams;
   based on the set of domain characteristics and the enriched domain information, clustering the set of domains to generate a set of campaign clusters of related domains, one or more campaign clusters including one or more new domains and at least one known domain, each campaign cluster including domains identified as belonging to a single campaign, wherein clustering the set of domains is iterative to reduce a number of related domains in one of the campaign clusters to be at or below a threshold size such that the related domains share a lowest level relationship;
   modifying the set of campaign clusters with a set of threat intelligence ratings to generate a set of enriched campaign clusters, a portion of the set of threat intelligence ratings corresponding to one or more domains within the set of campaign clusters;
   determining a cluster designation for each campaign cluster of the set of enriched campaign clusters; and
   distributing the cluster designations for each campaign cluster to one or more threat intelligence resource.

2. The computer-implemented method of claim 1, wherein clustering the set of domains further comprises:
   determining a first set of cluster keys for a first subset of domain characteristics of the set of domain characteristics; and
   clustering the set of domains to generate a first set of campaign clusters based on the first set of cluster keys.

3. The computer-implemented method of claim 2, wherein clustering the set of domains further comprises:
   determining a second set of cluster keys based on a second subset of domain characteristics of the set of domain characteristics; and
   clustering the first set of campaign clusters to generate a second set of campaign clusters based on the second set of cluster keys.

4. The computer-implemented method of claim 1, further comprising:
   generating a time-based cache for the set of domains, the time-based cache storing the set of domain information within a specified time range, wherein the set of domains are clustered based on the set of domain information and the specified time range.

5. The computer-implemented method of claim 1, wherein modifying the set of campaign clusters with the set of threat intelligence ratings further comprises:
   identifying one or more threat intelligence scores;
   generating the set of threat intelligence ratings based on the one or more threat intelligence scores; and applying a threat intelligence rating to each campaign cluster of the set of campaign clusters.

6. The computer-implemented method of claim 1, wherein determining the cluster designation for each campaign cluster further comprises:
classifying the set of threat intelligence ratings to generate a set of threat classes, each threat class indicating a campaign nature; and
applying a threat class of the set of threat classes to each campaign cluster.

7. The computer-implemented method of claim 1, wherein clustering the set of domains further comprises:
monitoring the plurality of input streams to identify subsequent domain information including a subsequent set of domains; and
iteratively clustering the set of domain clusters to incorporate the subsequent set of domains into one or more campaign clusters of the set of campaign clusters.

8. A system, comprising:
one or more processors; and
a computer-readable storage medium, coupled to the one or more processors, storing program instructions that, when executed by the one or more processors, cause the one or more processors to perform operations comprising:
extracting a set of domain information from a plurality of input streams, the set of domain information including a set of domains and a set of domain characteristics describing each domain, the plurality of input streams includes a first input stream of one or more domain registrars representing newly registered domains and a set of second input streams of one or more non-domain registrar sources containing domain information;
generating enriched domain information by correlating the set of domain information from the first input stream and the set of second input streams, the enriched domain information inserting missing data into domain information of a specified input stream from another input stream of the plurality of input streams;
based on the set of domain characteristics and the enriched domain information, clustering the set of domains to generate a set of campaign clusters of related domains, one or more campaign clusters including one or more new domains and at least one known domain, each campaign cluster including domains identified as belonging to a single campaign, wherein clustering the set of domains is iterative to reduce a number of related domains in one of the campaign clusters to be at or below a threshold size such that the related domains share a lowest level relationship;
modifying the set of campaign clusters with a set of threat intelligence ratings to generate a set of enriched campaign clusters, a portion of the set of threat intelligence ratings corresponding to one or more domains within the set of campaign clusters;
determining a cluster designation for each campaign cluster of the set of enriched campaign clusters; and
distributing the cluster designations for each campaign cluster to one or more threat intelligence resource.

9. The system of claim 8, wherein clustering the set of domains further comprises:
determining a first set of cluster keys for a first subset of domain characteristics of the set of domain characteristics; and
clustering the set of domains to generate a first set of campaign clusters based on the first set of cluster keys.

10. The system of claim 9, wherein clustering the set of domains further comprises:
determining a second set of cluster keys based on a second subset of domain characteristics of the set of domain characteristics; and
clustering the first set of campaign clusters to generate a second set of campaign clusters based on the second set of cluster keys.

11. The system of claim 8, wherein the operations further comprise:
generating a time-based cache for the set of domains, the time-based cache storing the set of domain information within a specified time range, wherein the set of domains are clustered based on the set of domain information and the specified time range.

12. The system of claim 8, wherein modifying the set of campaign clusters with the set of threat intelligence ratings further comprises:
identifying one or more threat intelligence scores;
generating the set of threat intelligence ratings based on the one or more threat intelligence scores; and
applying a threat intelligence rating to each campaign cluster of the set of campaign clusters.

13. The system of claim 8, wherein determining the cluster designation for each campaign cluster further comprises:
classifying the set of threat intelligence ratings to generate a set of threat classes, each threat class indicating a campaign nature; and
applying a threat class of the set of threat classes to each campaign cluster.

14. The system of claim 8, wherein clustering the set of domains further comprises:
monitoring the plurality of input streams to identify subsequent domain information including a subsequent set of domains; and
iteratively clustering the set of domain clusters to incorporate the subsequent set of domains into one or more campaign clusters of the set of campaign clusters.

15. A computer program product comprising a computer readable storage medium having program instructions embodied therewith, the program instructions being executable by one or more processors to cause the one or more processors to perform operations comprising:
extracting a set of domain information from a plurality of input streams, the set of domain information including a set of domains and a set of domain characteristics describing each domain, the plurality of input streams includes a first input stream of one or more domain registrars representing newly registered domains and a set of second input streams of one or more non-domain registrar sources containing domain information;
generating enriched domain information by correlating the set of domain information from the first input stream and the set of second input streams, the enriched domain information inserting missing data into domain information of a specified input stream from another input stream of the plurality of input streams;
based on the set of domain characteristics and the enriched domain information, clustering the set of domains to generate a set of campaign clusters of related domains, one or more campaign clusters including one or more new domains and at least one known domain, each campaign cluster including domains identified as belonging to a single campaign, wherein clustering the set of domains is iterative to reduce a number of related domains in one of the campaign clusters to be at or below a threshold size such that the related domains share a lowest level relationship;
modifying the set of campaign clusters with a set of threat intelligence ratings to generate a set of enriched campaign clusters, a portion of the set of threat intelligence ratings corresponding to one or more domains within the set of campaign clusters;
determining a cluster designation for each campaign cluster of the set of enriched campaign clusters; and
distributing the cluster designations for each campaign cluster to one or more threat intelligence resource.

16. The computer program product of claim 15, wherein clustering the set of domains further comprises:
    determining a first set of cluster keys for a first subset of domain characteristics of the set of domain characteristics; and
    clustering the set of domains to generate a first set of campaign clusters based on the first set of cluster keys.

17. The computer program product of claim 16, wherein clustering the set of domains further comprises:
    determining a second set of cluster keys based on a second subset of domain characteristics of the set of domain characteristics; and
    clustering the first set of campaign clusters to generate a second set of campaign clusters based on the second set of cluster keys.

18. The computer program product of claim 15, wherein modifying the set of campaign clusters with the set of threat intelligence ratings further comprises:
    identifying one or more threat intelligence scores;
    generating the set of threat intelligence ratings based on the one or more threat intelligence scores; and
    applying a threat intelligence rating to each campaign cluster of the set of campaign clusters.

19. The computer program product of claim 15, wherein determining the cluster designation for each campaign cluster further comprises:
    classifying the set of threat intelligence ratings to generate a set of threat classes, each threat class indicating a campaign nature; and
    applying a threat class of the set of threat classes to each campaign cluster.

20. The computer program product of claim 15, wherein clustering the set of domains further comprises:
    monitoring the plurality of input streams to identify subsequent domain information including a subsequent set of domains; and
    iteratively clustering the set of domain clusters to incorporate the subsequent set of domains into one or more campaign clusters of the set of campaign clusters.

* * * * *